Figure 1:
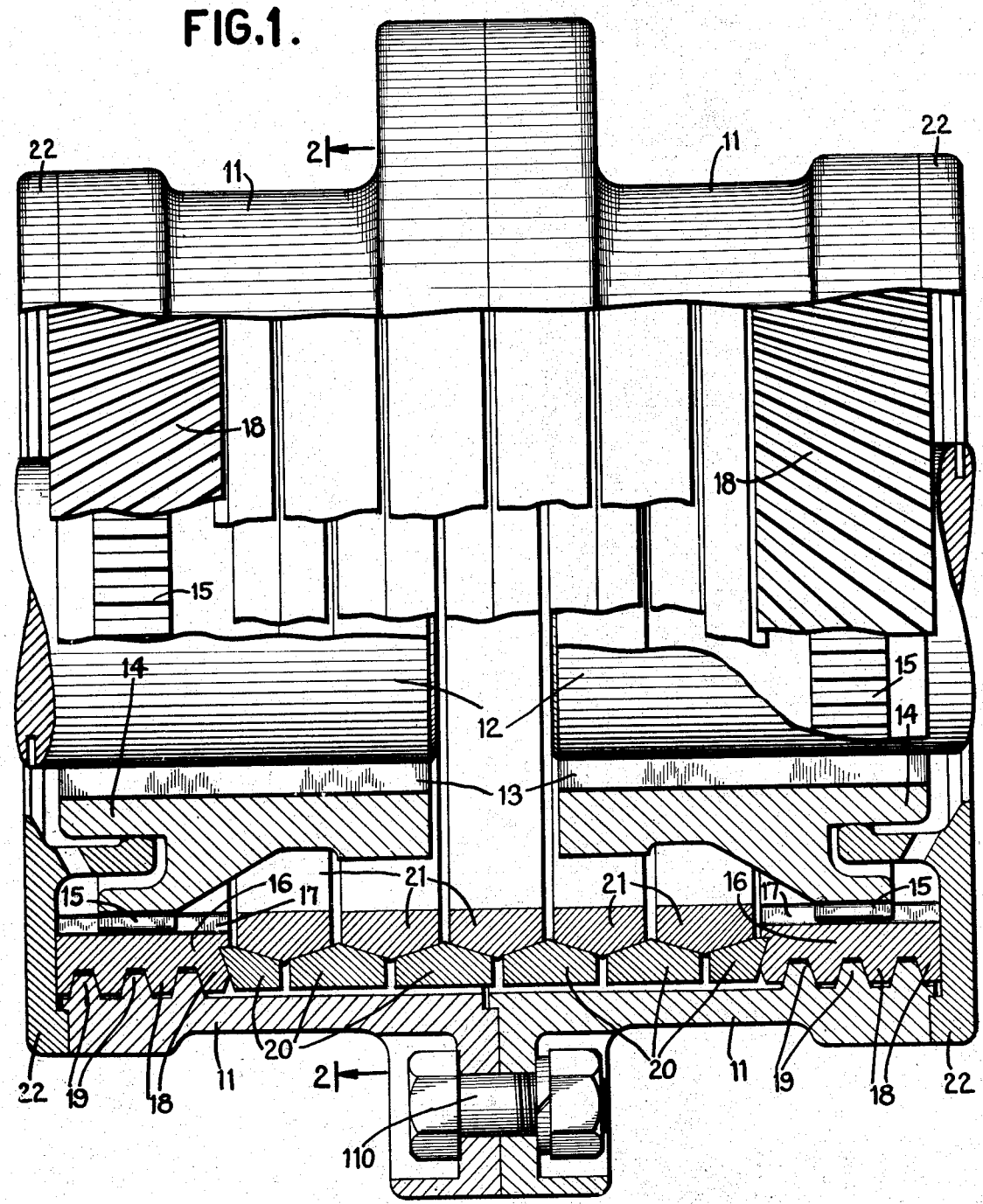

Nov. 19, 1935.  G. FAST  2,021,718

TORSIONALLY RESILIENT COUPLING

Filed Nov. 12, 1931  2 Sheets-Sheet 1

INVENTOR
Gustave Fast
BY his ATTORNEY

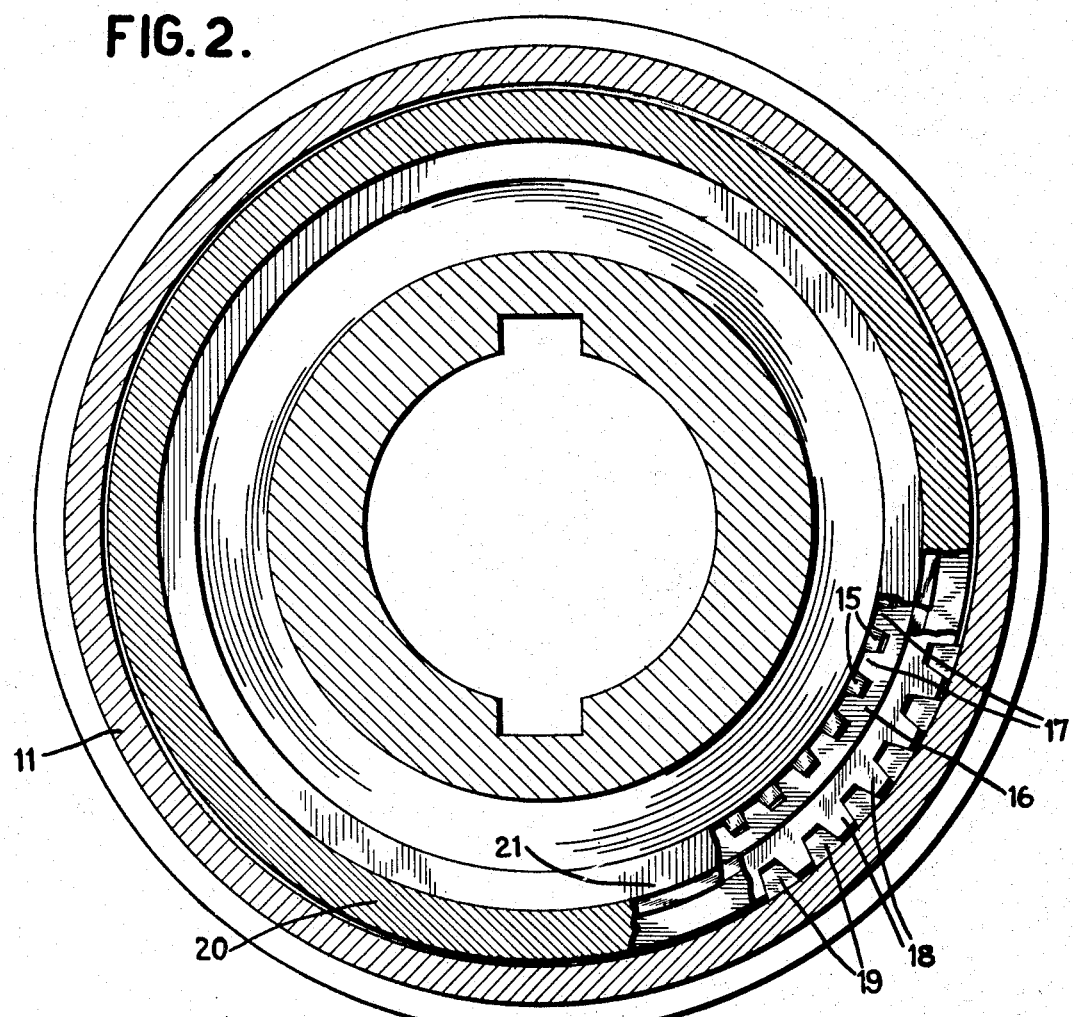
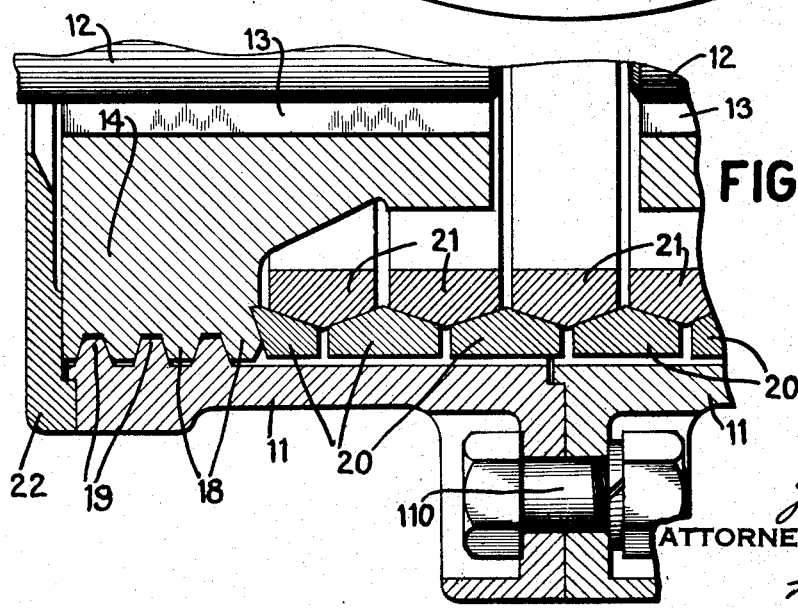

Patented Nov. 19, 1935

2,021,718

UNITED STATES PATENT OFFICE 2,021,718

TORSIONALLY RESILIENT COUPLING

Gustave Fast, Annapolis, Md., assignor to Gustave Fast Engineering Corporation, Annapolis, Md., a corporation of Maryland Application November 12, 1931, Serial No. 574,504

16 Claims. (Cl. 64—15)

This invention relates to coupling devices for connecting the shafts of driving and driven machines, and has for its object the provision of means for preventing, damping, or reducing in amplitude the oscillations which may be produced by variations in the torque transmitted between such machines. If, as may happen, the frequency of any such oscillations set up by a variation in the torque should coincide with the natural frequency of the system, the oscillations will be amplified and may become of considerable amplitude, thereby subjecting the shafts and coupling to dangerous stresses. It is an important object of the present invention to provide means whereby the excess energy made available for setting up shaft oscillations by an increase or a decrease in torque of one or the other of the connected machines may be partially absorbed, thereby damping the resulting oscillation of the system. For this purpose there has been provided a torsionally resilient connection between the driving and driven machines having a relatively great internal friction. The torsional resilience of the coupling releives the stresses in the connected shafts while the friction produces the desired damping and avoids the production of oscillations having the natural or a harmonic frequency of the system.

The invention has been illustrated as applied to a coupling of the self-aligning type, such as that disclosed in my Reissue Patent No. 15,177, as well as to an ordinary coupling. However, the present invention may be applied equally well to other types of coupling, and I do not wish to be limited to the particular application illustrated in the accompanying drawings, in which:

Fig. 1 is a side view of a self-aligning coupling to which the invention has been applied, partly in section and partly in elevation, with successive parts broken away to reveal the interior construction; Fig. 2 is a transverse vertical section on the line 2—2 of Fig. 1, with certain portions broken away; and Fig. 3 is a fragmentary vertical longitudinal section of a non-self-aligning or ordinary coupling to which the invention has been applied.

Referring more particularly to the drawings, it will be seen (Fig. 1) that the self-aligning coupling, with the present invention applied thereto, is substantially symmetrical. Therefore the description will be limited to the parts at one end of said coupling, it being understood that the parts at the other end are substantally identical with those described.

The casing of the coupling consists of two members 11, secured rigidly together by means of bolts 110 to constitute, in effect, a unitary structure. Two shafts 12 to be coupled are substantially in alignment and each has secured thereto, by means of a key 13, a hub 14, one portion of the periphery of which is toothed as at 15. A ring 16 surrounds the toothed portion of the hub 14, and is provided, on its interior surface, with teeth 17, which mesh with the teeth 15. The teeth 15 and 17 serve to transmit torque from shaft to coupling, and also provide the self-aligning feature, as is more fully described in my earlier patent referred to above.

The ring 16 is provided, on its outer surface, with helical teeth 18, which mesh with corresponding internal teeth 19 formed on the inner surface of the casing member 11. Teeth 18 on one of the rings 16 are of opposite sense from those on the other ring. The teeth 18 and 19, in addition to their other function to be presently described, serve to transmit torque between the ring 16 and the casing member 11, and thence, through similar means to the other shaft 12. Between the two rings 16 is interposed a strong spring, shown in the present embodiment as comprising two series of continuous, unbroken spring rings 20 and 21. The cooperating surfaces of the rings 20 and 21 are beveled, as illustrated, to provide a camming action between them as they are shifted axially in a manner to be explained. These rings are preferably formed of steel or similar elastic or resilient material so that upon shifting the rings together axially the rings 20 will be stretched or expanded, while the rings 21 will be compressed or contracted. Energy will thus be stored in these rings as the result of their relative movement toward each other and released upon relative movement apart. The ends of the coupling are closed by the retaining members 22, whose purpose and operation have no direct bearing upon the present invention, and are fully described in my earlier patent referred to above.

From the foregoing description of the invention, its operation will be readily understood. Assuming that the system is in operation, and the shafts and coupling are rotating at normal speed in a clockwise direction, as viewed from the right end of Fig. 1, it is apparent that, by reason of the cooperation of the helical teeth 18 and 19 the ring 16 will have been thrust inward or toward the left in Fig. 1 to shift the rings 20 and 21 together to an amount dependent upon the torque transmitted. When the elastic rings have been stressed to a sufficient degree, the inner rings being compressed and the outer rings stretched, the engagement between the teeth 18 and 19 will transmit the torque to the casing 11. At the opposite end the action of the corresponding teeth will simply force the ring 16 against the retaining member 22 and the ring will be rotated by the casing. If the rotation of the shafts were in the opposite direction, the ring 16 at the right end of Fig. 1 would be forced against the retainer 22 while the ring at the opposite end would be shifted toward the right and would tend to squeeze the spring rings together in the same way. In the event of a sudden increase in torque, under the conditions first assumed, the ring 16 at the right will be rotated a certain additional amount relative to the casing member 11, which rotation will cause the ring 16 to move inward to a further extent against the tension of spring rings 20 and 21, resulting in the setting up of additional stresses and the storage of greater energy in these rings. When the torque is decreased, the reverse movement of the ring 16 will take place, and the pressure between the rings 20 and 21 will be relieved to a certain extent, but the full amount of the energy stored in the rings 20 and 21 will not be returned, since a considerable proportion of this energy will have been dissipated by the friction between the spring rings, between the ring 16 and casing 11 and between the ring 16 and the adjacent ring 20.

It will be appreciated, therefore, that by use of the present invention the oscillations resulting from variations in torque may be greatly damped, and the minor oscillations completely eliminated, thereby preventing the occurrence of dangerous stresses in the coupling, shafts, and associated machines.

In the construction illustrated in Fig. 3, the self-aligning feature has been omitted from the coupling. The helical teeth 18 are formed upon the hub 14, the separate ring 16 having been omitted. In this construction the hubs 14 are permitted the lateral movements imparted to the rings 16 of the previous construction, the spring rings 20 and 21 being interposed directly between portions of the hubs 14.

By reversing the direction of the helical teeth at opposite ends of the coupling, in both forms of construction, i. e., by providing left hand teeth at one end and right hand at the opposite end, the system is equipped for the same type of action in either direction of rotation of the shafts, as has been explained.

The terms and expressions employed in the foregoing are to be considered as terms of description and not of limitation and the present invention is not to be regarded as limited to the particular construction described and illustrated, but it is recognized that many modifications thereof may be made within the scope of the appended claims.

What I claim is:

1. In a device for coupling a driving and a driven shaft, a coupling member, means for transmitting torque from the driving shaft to said member, said means and said member being provided with cooperating teeth whereby a relative rotative movement between said means and said member is accompanied by a relative translational movement therebetween, resilient means opposing said relative translational movement, and means for transmitting torque from said member to the driven shaft.

2. In a device for coupling a driving and a driven shaft, a coupling member, a member adapted to receive torque from the driving shaft and transmit said torque to said coupling member, said members being provided with cooperating helical teeth whereby said second mentioned member is capable of limited rotative and translational movements with respect to said coupling member, resilient means opposing said relative movements, and means for transmitting said torque from said coupling member to the driven shaft.

3. In a device for coupling a driving and a driven shaft, a coupling member, a member adapted to receive torque from the driving shaft and transmit said torque to said coupling member, said members being provided with cooperating helical teeth whereby said second mentioned member is capable of limited rotative and translational movements with respect to said coupling member, a spring adapted to be compressed upon translational movements of said second mentioned member, whereby said movements are opposed by said spring, and means for transmitting said torque from said coupling member to the driven shaft.

4. In a device for coupling a driving and a driven shaft, a hub secured to the driving shaft, a coupling member, resilient means for transmitting torque from said hub to said member, said resilient means comprising cooperating helical teeth formed upon said hub and said member, whereby said hub is capable of limited rotative and translational movement relative to said member, and resilient means opposing said movement, a second hub secured to the driven shaft, and means for transmitting torque from said member to said second hub.

5. In a device for coupling a driving and a driven shaft, a hub secured to the driving shaft and provided with helical teeth upon its periphery, a coupling member surrounding said hub and provided with cooperating helical teeth upon its inner surface, said member and hub being adapted for relative longitudinal movement, a second hub secured to the driven shaft, means having flat surface engagement interposed between said hubs for resiliently and frictionally resisting relative movement between the said member and first mentioned hub, and means for transmitting torque from said coupling member to said second hub.

6. In a coupling for driving and driven members a rigid coupling member, an element rotatable with each shaft and capable of limited rotational and axial movement with respect to said coupling member, and resilient means surrounding said elements and extending axially thereof adapted to be stressed by relative movement of said elements upon rotation of the driving member in either direction.

7. In a coupling for a pair of shafts a coupling member, an element rotatable with each shaft and capable of limited rotation with respect to said member, and resilient means comprising telescoping rings adapted to be wedged together and have energy stored therein upon relative movement of either of said elements and said member, the friction between said rings serving to damp the oscillations of said coupling.

8. In a coupling for a pair of shafts a casing surrounding the ends of said shafts, a series of unbroken, telescoping rings within said casing, and means operable upon rotation of said shafts in either direction for forcing said rings together to stretch certain of said rings and compress others and simultaneously to set up friction between them thereby damping the oscillations of the coupling.

9. A resilient and damping coupling between a pair of shafts comprising a coupling member, and means connecting said member with each of said shafts, said means including a series of unbroken, telescoping rings adapted to be forced into frictional engagement and devices for forcing said rings together upon rotation of said shafts in either directions.

10. A resilient and damping coupling between a pair of shafts comprising a coupling member, an element connected for rotation with each of said shafts, said elements being shiftable toward each other by said member upon rotation of the shafts in either direction and reislient means stressed in either direction and storing energy in proportion to the torque transmitted between said shafts, said means dissipating a portion of said energy in friction upon a reduction in the torque.

11. In a device of the class described, a driving member, a driven member, and a flexible driving connection between said members comprising resilient means adapted to be stressed upon relative rotation of said members in either direction, said means including a plurality of separate friction elements with parallel friction faces movable bodily relative to each other to damp and prevent rapid oscillation of said connection in response to minor fluctuations in torque.

12. A resilient and damping coupling between a driving member and a driven member comprising a plurality of unbroken, resilient rings having inclined surfaces adapted to be wedged together, and means operated by relative turning between said driving and driven members in response to variations in torque for wedging said rings together, the friction between said rings serving to damp the oscillations of the coupling.

13. A resilient and damping coupling between a pair of shafts comprising a coupling member, and means connecting said member with each of said shafts, said means including a plurality of separate, resilient, energy storing devices movable axially of said member and having cooperating, parallel, friction faces in flat engagement during movement of the devices, said devices permitting relative turning between said shafts in response to variations in torque and creating friction for dissipating the stored energy.

14. In a device of the class described a driving member, a driven member, and a flexible driving connection between said members comprising an element connected positively with one of said members for rotation therewith, means connecting said element with the other of said members, said means including a part having limited rotational and longitudinal movement relative to one of said members, and means comprising elements having parallel faces in flat surface contact cooperating with said element for resiliently and frictionally resisting said relative movement.

15. In a device of the class described, a driving member, a driven member, and a flexible driving connection between said members comprising a plurality of separate, axially shiftable resilient means adapted to be stressed upon relative rotation of said members, said means having parallel faces arranged to be brought into frictional engagement upon relative rotation of said members to damp and prevent rapid oscillation of said connection in response to minor fluctuations in torque.

16. A resilient and damping coupling between a pair of shafts comprising a rigid coupling member, an element connected for rotation with each of said shafts, said elements being confined within said member and shiftable toward each other by said member upon the driving of either of the shafts in either direction, and resilient means for resisting said relative shifting of the elements.

GUSTAVE FAST.